(12) United States Patent
Carrie et al.

(10) Patent No.: US 10,436,278 B2
(45) Date of Patent: Oct. 8, 2019

(54) DAMPING ASSEMBLY

(71) Applicant: Ratier-Figeac SAS, Figeac (FR)

(72) Inventors: Jean-Paul Carrie, Figeac (FR); Julian Serieys, Figeac (FR)

(73) Assignee: RATIER-FIGEAC SAS, Figeac (FR)

(*) Notice: Subject to any disclaimer, the term of this patent is extended or adjusted under 35 U.S.C. 154(b) by 0 days.

(21) Appl. No.: 15/816,147

(22) Filed: Nov. 17, 2017

(65) Prior Publication Data
US 2018/0142757 A1    May 24, 2018

(30) Foreign Application Priority Data

Nov. 21, 2016    (EP) ..................................... 16306524

(51) Int. Cl.
| | |
|---|---|
| F16F 9/54 | (2006.01) |
| B64C 13/04 | (2006.01) |
| F16F 9/19 | (2006.01) |
| G05G 1/04 | (2006.01) |
| G05G 5/03 | (2008.04) |
| F16F 9/32 | (2006.01) |
| F16F 9/38 | (2006.01) |
| F16F 9/20 | (2006.01) |

(52) U.S. Cl.
CPC ................ *F16F 9/54* (2013.01); *B64C 13/04* (2013.01); *B64C 13/0421* (2018.01); *F16F 9/19* (2013.01); *F16F 9/3221* (2013.01); *F16F 9/3228* (2013.01); *G05G 1/04* (2013.01); *G05G 5/03* (2013.01); *F16F 9/20* (2013.01); *F16F 9/38* (2013.01); *F16F 2230/0023* (2013.01); *F16F 2230/0041* (2013.01); *F16F 2230/24* (2013.01); *G05G 2505/00* (2013.01)

(58) Field of Classification Search
CPC combination set(s) only.
See application file for complete search history.

(56) References Cited

U.S. PATENT DOCUMENTS

| | | | |
|---|---|---|---|
| 6,193,223 B1* | 2/2001 | Jackson | ................ F16F 9/185 |
| | | | 267/64.12 |
| 8,590,843 B2 | 11/2013 | Biest et al. | |
| 9,067,672 B2 | 6/2015 | Yates et al. | |
| (Continued) | | | |

FOREIGN PATENT DOCUMENTS

| | | | | |
|---|---|---|---|---|
| EP | 0352417 A2 * | 1/1990 | ............ | B64C 13/04 |
| EP | 0352417 A2 | 1/1990 | | |
| (Continued) | | | | |

OTHER PUBLICATIONS

Extended European Search Report for International Application No. 16306524.6 dated May 16, 2017, 8 pages.

*Primary Examiner* — Zakaria Elahmadi
(74) *Attorney, Agent, or Firm* — Cantor Colburn LLP

(57) ABSTRACT

A damping assembly comprises a connecting rod for connection to a moving part to be damped, a damper comprising a piston, a mechanical fuse coupling the connecting rod to the damper, the mechanical fuse configured such that when a force between the connecting rod and damper reaches a threshold value the connecting rod becomes uncoupled from the piston. The damping assembly further comprises a biasing member that biases the piston towards a central position such that the connecting rod may be re-coupled to the piston.

11 Claims, 1 Drawing Sheet

(56) References Cited

U.S. PATENT DOCUMENTS

2011/0214956 A1* 9/2011 Marking .............. B60G 13/06
                                                    188/313
2015/0367700 A1* 12/2015 Allen .................... B60G 11/62
                                                    280/124.16
2017/0016476 A1    1/2017 Carrie

FOREIGN PATENT DOCUMENTS

EP          2043909 A1    4/2009
JP          S5977140 A    5/1984

* cited by examiner

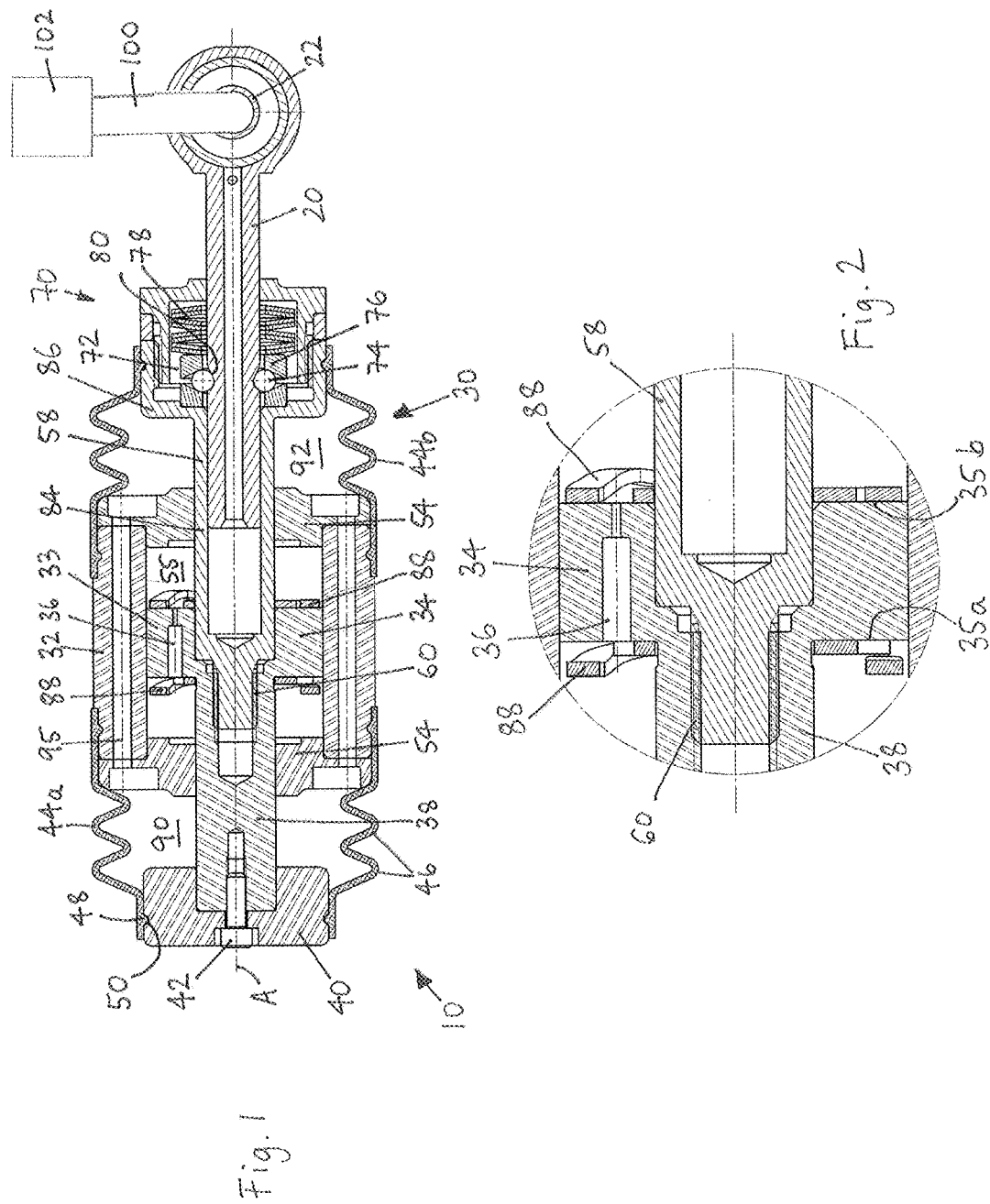

DAMPING ASSEMBLY

FOREIGN PRIORITY

This application claims priority to European Patent Application No. 16306524.6 filed Nov. 21, 2016, the entire contents of which is incorporated herein by reference.

TECHNICAL FIELD

The present disclosure relates to damping assemblies, particularly those including mechanical fuses.

BACKGROUND

Control sticks may be used to mechanically transmit commands, for example to control movement of vehicles. Movement of the control stick may be damped in order to provide improvement in user control and haptics. Damping assemblies for control sticks may become jammed during use. For example, components of the damper may become damaged and/or foreign objects may enter the damper preventing relative movement of parts of the damper. For this reason, control stick damping assemblies may incorporate a mechanical fuse that allows the control stick to be operated in the event that the damper becomes jammed. Such fuses may include parts that become moveable relative to the rest of the damper when a threshold force is experienced by the damper. In such damping assemblies a need exists to reset the damper to its original function such that the parts can become re-engaged with the damper after the jam has been removed.

SUMMARY

From a first aspect, this disclosure provides a damping assembly. The damping assembly comprises a connecting rod for connection to a moving part to be damped, a damper comprising a piston, a mechanical fuse coupling the connecting rod to the damper, the mechanical fuse configured such that when a force between the connecting rod and damper reaches a threshold value the connecting rod becomes uncoupled from the piston. The damping assembly further comprises a biasing member that biases the damper towards a central position such that the connecting rod may be re-coupled to the piston.

The mechanical fuse may include a ball bearing and the connecting rod may include a circumferential groove. The ball bearing may be configured for engagement with the groove in order to couple the connecting rod to the damper. The ball bearing may be dis-engaged with the groove once the threshold value is reached.

The groove may be v-shaped.

The damper may comprise a piston including a piston sleeve and a piston head slidable within the piston sleeve and at least one end cap limiting the extent of movement of the piston head within the sleeve. The biasing member may mounted such that it forces the piston head away from the at least one end cap when adjacent thereto.

The biasing member may be mounted to the piston head and/or the at least one end cap.

The biasing member may be a spring such as a helicoid or leaf spring, a resilient plastics or foam material or a magnet.

A control assembly for mechanically transmitting commands may comprise a grip for manual manipulation by a user, a control stick coupled to the grip such that movement of the grip causes movement of the control stick and a damping assembly according to any of the embodiments above, wherein the connecting rod is connected to the control stick such that the damping assembly damps movement of the control rod.

The control assembly may further comprise a bearing mounted between the connecting rod and control stick.

A vehicle may comprise the control assembly as described in the embodiments above. The control assembly may be configured to control movement of the vehicle.

The damping assembly may be sized and configured such that the connecting rod and the piston can be recoupled while the vehicle is in operation.

BRIEF DESCRIPTION OF DRAWINGS

Some embodiments of the disclosure will now be described by way of example only and with reference to the accompanying drawings in which:

FIG. 1 shows a damper assembly; and

FIG. 2 shows a detail view of the damper assembly of FIG. 1.

DETAILED DESCRIPTION

With reference to FIG. 1, an exemplary damper assembly 10 is illustrated. The damper assembly 10 includes a connecting rod 20 for connection to a control stick 100 of a vehicle via a bearing 22. A damper 30 includes a sleeve 32 which extends around an axis A of the damper 30 and a piston 33 which includes a piston head 34 configured to slide within the sleeve 32 along the axis A. The sleeve 32 is fixed to a component of a vehicle, for example, which is being controlled. The damper 30 therefore acts to ensure linear movement of the connecting rod 20 along the axis A of the sleeve 32. The piston head 34 may further include a hole 36 extending therethrough from one axial face 35a of the piston head 34 to the other axial end face 35b of the piston head 34, as best shown in FIG. 2. The diameter of the hole 36 may vary along its length, for example the hole 36 may have a greater diameter at an end furthest from the connecting rod 20.

The piston 33 further includes a piston rod 38 which extends in the axial direction beyond the sleeve 32 at an opposite end of the sleeve 32 to the connecting rod 20. The piston rod 38 is connected to an end member 40, outside of the sleeve 32, via a mechanical fastener 42 such as a screw or bolt.

The end member 40 is connected to the sleeve 32 via a first bellows 44a. The first bellows 44a is formed from an annular piece of plastics material having corrugations 46 to allow extension of the axial length of the bellows 44a. The first bellows 44a is attached to the end member 40 and the piston sleeve 32 via internal protrusions 48 which are retained in external grooves 50 on outer surfaces of the end member 40 and the sleeve 32. The first bellows 44a may be clamped to the end member 40 and sleeve 32 by any means known in the art.

Sleeve caps 54 are fixed to either axial end of the sleeve 32. The sleeve caps 54 and the sleeve 32 together define an inner volume 55 of the damper 30. The inner volume 55 may be filled with air or other gas or may contain oil or other fluid or lubricant to facilitate and/or control resistance to movement of the piston head 34 within the sleeve 32. The hole 36 in the piston head 34 may allow fluid to pass therethrough at a resistance that provides at least some of the damping for the system.

The sleeve caps 54 limit the extent of axial movement of the piston head 34 within the sleeve 32 between the two inner surfaces thereof. The sleeve caps 54 may be fixed to the sleeve 32 by any means known in the art including by mechanical fastener such as screws, bolts, clips, clamps, keys or by welding, bonding or by interference fit.

As shown in the detail view of FIG. 2, biasing members 88 are mounted on both axial end faces 35a, 35b of the piston head 34. The biasing members 88 are configured to create a biasing force between the piston head 34 and either sleeve cap 54 when the piston head 34 is in a region adjacent either sleeve cap 54. The biasing members 88 force the piston head 34 away from the sleeve caps and towards a central region of the sleeve 32. In the illustrated embodiment, the biasing members 88 are circular leaf springs, however it will be appreciated that any biasing member capable of providing a biasing force in the axial direction of the piston 33 could be used, for example in other embodiments a compression spring or a resilient material such as plastic or rubber may be used. Alternatively, the biasing members 88 may comprise magnets.

A bearing rod 58 is received within the piston 33 and includes a threaded portion 60, as shown in more detail in FIG. 2, for engagement with an internal thread of the piston rod 38. Although the bearing rod 58 is shown connected to the piston rod 38 at an end thereof, it will be appreciated that the bearing rod 58 may be connected to the piston rod 58 or piston head 34 at any position to ensure axial coupling therebetween.

The bearing rod 58 further includes a hollow main shaft portion 84 and a larger diameter portion 86 its other end, distal from the threaded portion 60. The larger diameter portion 86 is connected to the sleeve 32 via a second bellows 44b. The second bellows 44b is constructed in much the same way as the first bellows 44a described above. The second bellows 44b is attached to the bearing rod 58 and the sleeve 32 via internal protrusions 48 which are received in external grooves 50 on outer surfaces of the larger diameter portion 86 of the bearing rod 58 and the sleeve 32. The second bellows 44b may be clamped to the bearing rod 58 and sleeve 32 by any means known in the art.

The first bellows 44a and the second bellows 44b seal the damper 33 from the external environment. The bellows 44a, 44b may help protect the damper 33 from foreign object damage and may limit the ingress of foreign objects such as debris and dust for example.

The first bellows 44a and second bellows 44b define internal volumes 90, 92 which may contain a fluid such as oil. The internal volumes 90, 92 may be connected by channels 95 through which the fluid may flow during operation of the damper 30.

The bearing rod 58 is connected to the connecting rod 20 via a mechanical fuse 70. The hollow main shaft portion 84 of the bearing rod 58 receives a portion of the connecting rod 20 therein and larger diameter portion 86 receives and is connected to the mechanical fuse 70.

The mechanical fuse 70 includes a bearing 72 including a plurality of balls 74 positioned within a bearing housing 76. The bearing 72 surrounds the connecting rod 20 such that the balls 72 are seated with a groove 80 formed in an external surface of the connecting rod 20. In the embodiment, the groove 80 extends around the entire circumference of the connecting rod 20 and has a V-shaped cross-section, however it will be appreciated that the groove 80 may extend only partially around the circumference of the connecting rod 20 and that other cross-sections may be used.

The mechanical fuse 70 further includes a biasing member 78, the biasing member 78 of the illustrated embodiment comprises Belleville washers surrounding the connecting rod 20 and engaging the bearing 72 at one end thereof however other washers and/or a spring may be used. The biasing member 78 also engages, at its other end, a housing 82 of the mechanical fuse 70. The housing 82 contains the bearing 72 and biasing member 78 and is attached to the bearing rod 58 at the larger diameter portion 86. The larger diameter portion 86 at least partially contains the bearing 72 therein. The biasing member 78 is preloaded with a biasing force which acts against the bearing 72 and housing 82 to secure the axial position of the bearing 72 within the mechanical fuse 70.

The larger diameter portion 86, the housing 82 and the biasing members 78 together hold the bearing 72 in a fixed axial position relative to the sleeve 32. The balls 74, when seated in the groove 80 of the connecting rod 20, thereby couple the connecting rod to the piston 30 via the fuse 70.

In use, a control stick 100 mounted to the bearing 22 of the connecting rod 20 is manually manipulated via a grip 102 in order to mechanically transmit commands, for example to control vehicle movement. When the movement of the control stick 100 includes a component in the axial direction, the connecting rod 20, bearing rod 58, piston head 34, piston rod 38 and end member 40 move together along the axis A against a resistive force applied by the bellows 44. The resistive force of the fluid in the volume 55 and/or the bellows 44 acts to damp the movement of the control stick 100 and prevent sharp movements and otherwise improve the control and haptics of the system. The use of the damper 30 ensures that the damped movement is restricted to the direction of the axis A of the piston 33 and only along the axial extent of the sleeve 32 between the two end caps 54. The connecting rod 20 being coupled to the bearing rod 58 via the balls 74 seated within the groove 80.

When the piston head 34 reaches either axial extent of its range of movement i.e. adjacent either one of the end caps 54, the respective biasing member 88 engages the respective end cap 54 and thereby provide a restoring force to piston head 34 towards a central position within the sleeve 32. The biasing members 88 therefore bias the piston head 34 towards a central region of the damper 33 between the two end caps 54. The piston head 34 can only be maintained in a position adjacent the end caps 54 with continuous force applied to the control stick 100.

In the event that the piston head 34 becomes jammed within the sleeve 32 such that the piston head 34 cannot be moved along the axis A under usual operating forces of the control stick 100, for example if the components of the damper 30 become damaged or foreign object debris enters the sleeve 32, the increased axial force on the balls 78 of the bearing 72 causes the balls 78 to be forced out of the groove 80 and engage an outer surface of the connecting rod 20 on either side of the groove 80. The axial force between the connecting rod 20 and fuse 70 required to force the balls 74 out of the groove 80 is called the break out force of the fuse. The dimensions of the balls 74 and groove 80 may be designed such that the break out force may be achieved by manual actuation of the control stick 100 via grip 102 within ergonomic limits.

Once the balls 78 are outside of the groove 80, the only force between the bearing rod 58 and connecting rod 20 is the friction between the balls 78 and the outer surface of the connecting rod 20. The connecting rod 20 therefore becomes moveable within bearing rod 58, with the ball and rod friction providing some resistive force. In certain other circumstances, the balls 74 may unintentionally become disengaged with the groove 80 for example when the damping force exceeds the breakout force of the fuse.

Once the source of the jamming has been removed the connecting rod 20 may be moved within the bearing 72 until the balls 74 re-engage the groove 80 to restore the assembly to its original damping function. However, if the piston head 34 is positioned in either extreme position, i.e. abutting either end cap 54, the range of movement of the connecting rod 20 by the control stick 100 may not be sufficient to allow reengagement of the balls 74 within the groove 80, for example if the range of movement of the control stick 100 is less than the full axial extent of movement of the piston 33. The biasing members 88 force the piston head 34 towards a more central position in which the balls 74 may be re-engaged with the groove 80 to restore the original function of the damper 30.

Moveover, the biasing members 88 may help prevent jamming of the piston head 34 in the vicinity of the end caps 34 by providing a constant force on the piston head 34 in this area.

Although the embodiment described above includes two biasing members 88, one mounted on each opposing face of the piston head 34, it will be appreciated that the damper may include only one biasing member on mounted to either one of the opposing faces. In alternative embodiments, the biasing members 88 may not be mounted to the piston head 34 but instead mounted to the end caps 54 for engagement with the piston head 34 as it approaches.

The invention claimed is:

1. A damping assembly comprising:
    a connecting rod for connection to a moving part to be damped;
    a damper comprising a sleeve and a piston, the piston having a piston head configured to slide within the sleeve along an axis thereof, the sleeve having a first end and a second end and defining an inner volume containing a damping fluid and the piston head comprising a hole extending therethrough from a first axial face of the piston head to a second axial end face of the piston head for allowing damping fluid to pass from the first axial face of the piston to the second axial face of the piston;
    a mechanical fuse coupling the connecting rod to the piston, the mechanical fuse being arranged externally of the sleeve and configured such that when a force between the connecting rod and damper reaches a threshold value, the connecting rod becomes uncoupled from the piston; and
    a first biasing member arranged between the first end of the sleeve and a first end face of the piston head; and
    a second biasing member arranged between the second end of the sleeve and a second end face of the piston head;
    the first and second biasing members being configured to bias the piston away from the first and second ends of the sleeve respectively a towards a central position when the piston is in respective extreme axial positions within the sleeve such that the connecting rod may be re-coupled to the piston.

2. The damping assembly of claim 1, further comprising at least one end cap limiting the extent of movement of the piston head within the sleeve, wherein a respective biasing member is mounted such that it forces the piston head away from the at least one end cap when adjacent thereto.

3. The damping assembly of claim 2, wherein the first and second biasing members are member is mounted to the piston head and/or the at least one end cap.

4. The damping assembly of claim 3, wherein the first biasing member and the second biasing member are mounted to the respective end faces of the piston head.

5. The damping assembly of claim 1, wherein the first biasing member or the second biasing member is a spring such as a helicoid or leaf spring.

6. The damping assembly of claim 1, wherein the first biasing member or the second biasing member is a resilient plastics or foam material.

7. The damping assembly of claim 1, wherein the first biasing member or the second biasing member is a magnet.

8. A control assembly for mechanically transmitting commands comprising:
    a grip for manual manipulation by a user;
    a control stick coupled to the grip such that movement of the grip causes movement of the control stick; and
    a damping assembly comprising:
        a connecting rod for connection to a moving part to be damped;
        a damper comprising a sleeve and a piston, the piston having a piston head configured to slide within the sleeve along an axis thereof, the sleeve having a first end and a second end and defining an inner volume containing a damping fluid and the piston head comprising a hole extending therethrough from a first axial face of the piston head to a second axial end face of the piston head for allowing damping fluid to pass from the first axial face of the piston to the second axial face of the piston;
        a mechanical fuse arranged externally of the sleeve and coupling the connecting rod to the piston, the mechanical fuse configured such that when a force between the connecting rod and damper reaches a threshold value, the connecting rod becomes uncoupled from the piston; and
        a first biasing member arranged between the first end of the sleeve and a first end face of the piston head; and
        a second biasing member arranged between the second end of the sleeve and a second end face of the piston head;
        the first and second biasing members being configured to bias the piston away from the first and second ends of the sleeve respectively towards a central position when the piston is in respective extreme axial positions within the sleeve such that the connecting rod may be re-coupled to the piston;
    wherein the connecting rod is connected to the control stick such that the damping assembly damps movement of the control stick.

9. The control assembly of claim 8, further comprising a bearing mounted between the connecting rod and control stick.

10. A vehicle comprising:
    control assembly for mechanically transmitting commands comprising:
        a grip for manual manipulation by a user;
        a control stick coupled to the grip such that movement of the grip causes movement of the control stick;
        a bearing mounted between a connecting rod for connection to a moving part to be damped and the control stick; and
    a damping assembly comprising:
        a connecting rod for connection to a moving part to be damped;

a damper comprising a sleeve and a piston, the piston having a piston head configured to slide within the sleeve along an axis thereof, the sleeve having a first end and a second end and defining an inner volume containing a damping fluid and the piston head comprising a hole extending therethrough from a first axial face of the piston head to a second axial end face of the piston head for allowing damping fluid to pass from the first axial face of the piston to the second axial face of the piston;

a mechanical fuse arranged externally of the sleeve and coupling the connecting rod to the piston, the mechanical fuse configured such that when a force between the connecting rod and damper reaches a threshold value, the connecting rod becomes uncoupled from the piston; and a first biasing member arranged between the first end of the sleeve and a first end face of the piston head; and a second biasing member arranged between the second end of the sleeve and a second end face of the piston head;

the first and second biasing members being configured to bias the piston away from the first and second ends of the sleeve respectively towards a central position when the piston is in respective extreme axial positions within the sleeve such that the connecting rod may be re-coupled to the piston;

wherein the connecting rod is connected to the control stick such that the damping assembly damps movement of the control stick;

wherein the control assembly is configured to control movement of the vehicle.

11. The vehicle of claim 10, wherein the damping assembly is sized and configured such that the connecting rod and the piston can be recoupled while the vehicle is in operation.

* * * * *